United States Patent Office 3,487,607
Patented Jan. 6, 1970

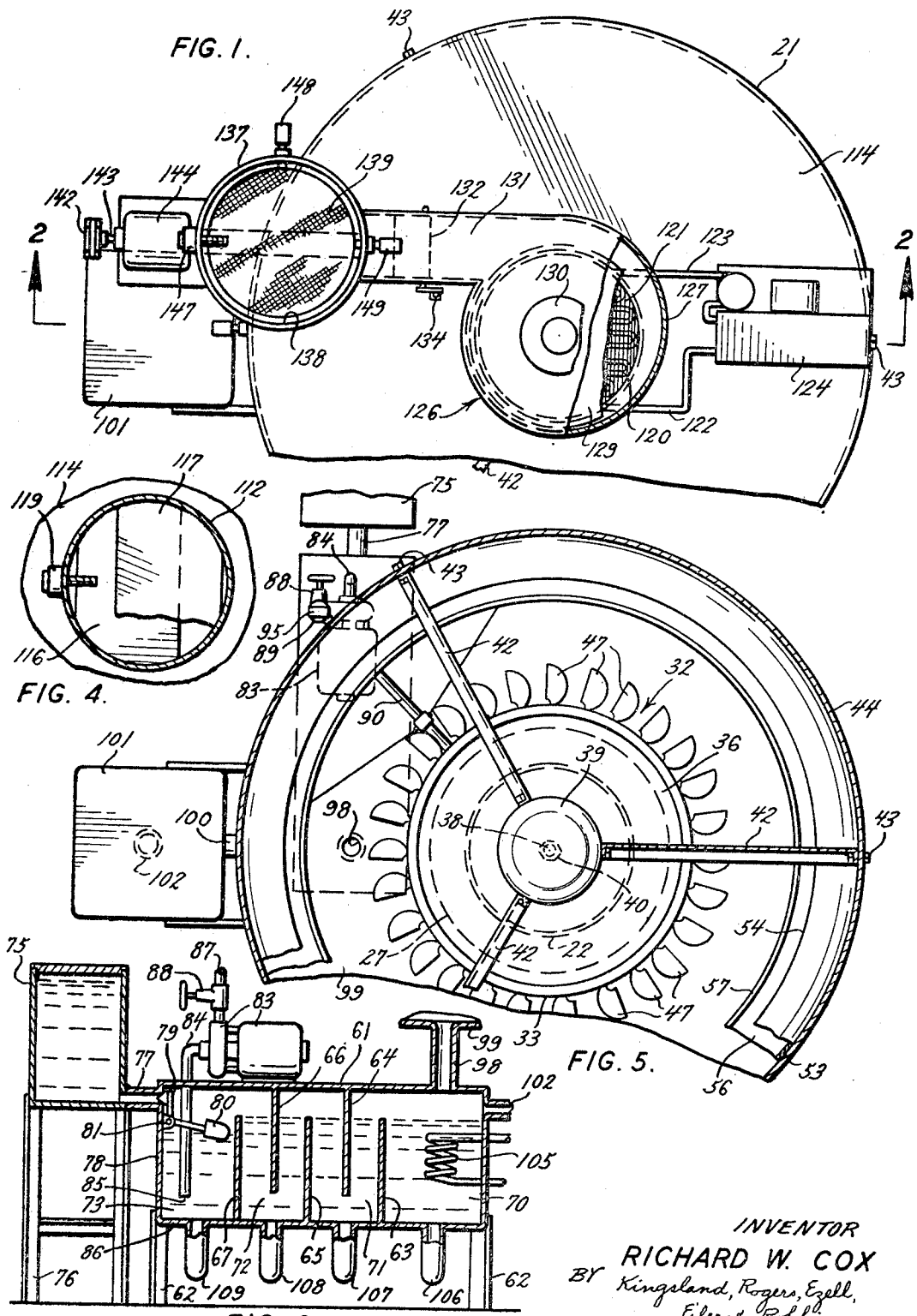

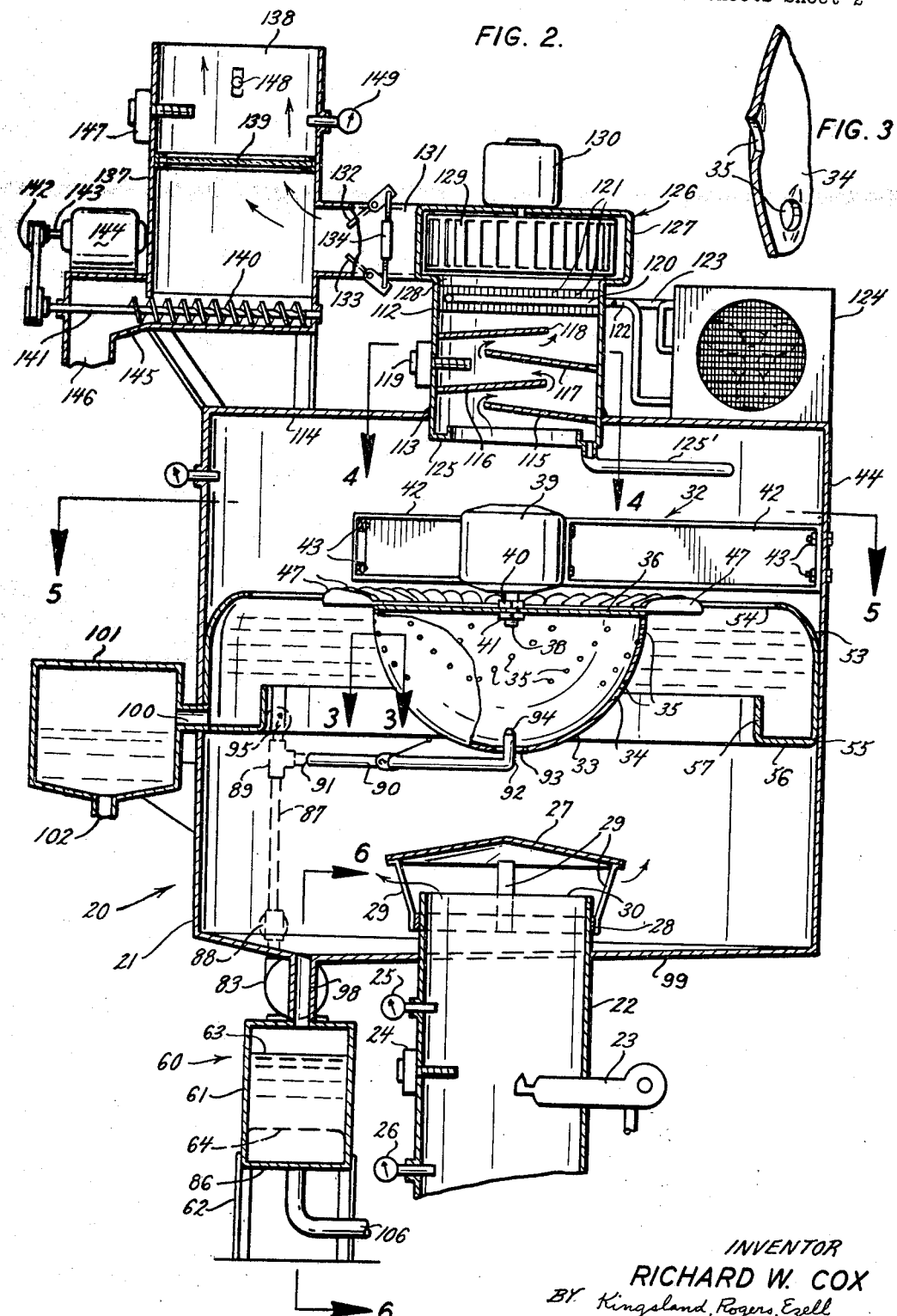

3,487,607
EXHAUST FILTRATION AND COLLECTOR
SYSTEM
Richard W. Cox, 11037 Easy St., St. Ann, Mo. 63054
Filed Dec. 14, 1967, Ser. No. 690,449
Int. Cl. B01d 47/08, 47/00
U.S. Cl. 55—222     4 Claims

ABSTRACT OF THE DISCLOSURE

A filtration and collector system which removes foreign particles from contaminated air by first heating the contaminated air for combustion of the foreign particles, then subjecting the foreign particles in the air stream to bombardment of liquid streams created by a rotary impeller, then condensing the liquid from the air in a condenser, and finally passing the air through a fine mesh filter screen. The liquid used to provide the high velocity liquid streams is circulated through a recovery tank wherein the particles removed from the air stream are separated from the liquid and the liquid is resupplied to the impeller.

BRIEF DESCRIPTION OF THE INVENTION

In this filtration and collector system, there is a housing having an inlet and an outlet. The inlet is connected to an exhaust stack or any other supply of air carrying foreign matter. A burner in the path of the exhaust stream heats the exhaust stream to its flash point for more complete combustion of the foreign particles.

An impeller is mounted within the housing above the inlet. The impeller has two functions: One is to create a wall of liquid streams. The other is to propel the exhaust stream through the housing. To create the liquid wall, the impeller has a diverging wall that is rotated by a motor. Liquid is introduced at the lower, smaller end into the interior of the divergent impeller and is discharged against the impeller inner wall. Centrifugal forces of rotation of the impeller at a preselected rotational speed cause the liquid to flow upwardly along the inner surface of the diverging wall. There are holes through the casing of the impeller, and the rotating impeller drives liquid through the holes in the casing in streams toward the side wall of the housing.

The impeller casing may also be provided with external blades to propel the exhaust stream through the housing. The pitch, size, and number of these blades can be varied according to the desired velocity of the exhaust stream.

The exhaust stream is drawn upwardly through the housing and, in reaching the path of the liquid stream, the foreign particles are driven laterally by the liquid streams by a combination of kinetic energy and absorption. This forms a kinetic liquid screen which filters out foreign matter. The liquid streams now carrying the foreign particles are directed against a curved deflector wall which deflects the liquid streams and foreign particles into an annular collection trough from which the liquid and foreign particles can flow for return to a recovery tank.

The cleansed air is drawn upwardly by a blower past a series of baffle walls and a refrigeration coil. The cooled baffle walls and the refrigeration coil condense the liquid as well as foreign vapor from the air. This condensed liquid is also delivered to the recovery tank. The thus dried air finally flows through a fine pore filter and is discharged to the atmosphere.

In the recovery tank, the liquid is passed through a series of chambers in which the foreign particles are permitted to settle, enabling their removal from the recovery tank. The liquid thus purified is then again made available for use in the impeller. An auxiliary reservoir replenishes any depletion of the liquid supply available in the recovery tank.

BRIEF DESCRIPTION OF THE DRAWINGS

FIGURE 1 is a fragmentary top plan view of the filtration and collector system with parts broken away;
FIGURE 2 is a view in section taken along the line 2—2 of FIGURE 1;
FIGURE 3 is an enlarged fragmentary view in section taken along the line 3—3 of FIGURE 2;
FIGURE 4 is a fragmentary view in section taken along the line 4—4 of FIGURE 2;
FIGURE 5 is a fragmentary view in section taken along the line 5—5 of FIGURE 2; and
FIGURE 6 is a view in longitudinal medial section on a reduced scale of the recovery tank.

DETAILED DESCRIPTION OF THE INVENTION

Referring to FIGURE 2, the filtration system 20 includes a housing 21 that may be mounted wherever contaminated air is being discharged. For illustration, the housing 21 is shown mounted on a stack 22 that carries exhaust from any industrial converter. In this illustrated embodiment, the exhaust stream enters at the bottom of the housing 21, but for other installations, it may enter at the side. An afterburner 23 is connected into the stack to heat the exhaust air and there are a thermometer 24 and gauges 25 and 26 for indicating the exhaust air temperature, pressure, and velocity. A baffle shield 27 is mounted by a circular clamp 28 and struts 29 above the upper end 30 of the stack 22 to deflect the exhaust air and disperse it over a large area within the housing 21.

An impeller assembly 32 is mounted within the housing 21 above the baffle shield 27. The impeller assembly comprises an impeller casing 33 having an outwardly flared side wall 34 that is of circular cross-section at any horizontal plane. There are a plurality of holes 35 arranged in a circumferential band near the top of the impeller casing 33, and a cover plate 36 is welded or otherwise fixed to the upper side of the casing 33.

The impeller casing 33 is suspended on a threaded motor shaft 38 that is connected to a motor 39. The shaft 38 is secured by bolts 40 and 41 threaded against opposite sides of the cover plate 36. The motor 39 is supported in place by a plurality of horizontal brackets 42 fastened by bolts 43 to the side wall 44 of the housing 21.

There are a plurality of blades 47 extending radially outwardly from the cover plate 36. These blades 47 are pitched and sized according to the desired flow that is to be imparted to the exhaust stream.

A curved deflection board 53 is fixed in a ring to the inner surface of the housing side wall 44. The deflection board 53 is curved inwardly toward its upper edge 54, the latter being located above the impeller casing 33, or at least above the upper plane of the liquid streams driven through the holes 35 in a manner to be described. The lower edge 55 of the deflection board 53 merges with the outer edge of an annular trough 56 that has an upwardly extending inner side wall 57 enabling it to collect liquids deflected downwardly by the deflection board 53.

Liquid is supplied to the impeller casing 33 and is collected from the annular trough 56 by use of a recovery tank 60 shown in FIGURES 2 and 6. The recovery tank 60 comprises a liquid enclosure 61 mounted on a stand 62 near the stack 22. The compartment 61 is divided by a plurality of baffle walls 63, 64, 65, 66, and 67 into a series of chambers 70, 71, 72, and 73 with the baffle walls causing liquid within the compartment 61 to flow serially from the inlet chamber 70 through the chambers 71 and 72 to the outlet chamber 73.

Adjacent the outlet chamber 73, there is a liquid replenishment supply tank 75 mounted on a stand 76, unless the liquid replenishment source is city water supply. An outlet pipe 77 from the tank 75 may be above the liquid level in the chamber 73 as defined by the baffle wall 67 to avoid the necessity of a liquid pump. The pipe 77 is connected through the end wall 78 of the liquid compartment 61. Flow of liquid through the pipe 77 is regulated by a valve 79 that in turn is controlled by a float 80 connected to it, the valve 79 and float 80 being pivotally mounted on a bracket 81 fastened to the end wall 78. The float 80 keeps the valve 79 closed until the level of liquid within the chamber 73 drops below a predetermined level.

A pump 83 is mounted above the compartment 61. A suction pipe 84 leads to the pump 83 and extends through the upper wall of the liquid compartment 61 above the chamber 73. The lower end 85 of the suction pipe 84 is positioned below the liquid level within the chamber 73 but above the bottom wall 86 of the compartment 61. A discharge pipe 87 extends from the pump 83 through a regulator valve 88. As shown in FIGURE 2, the pipe 87 leads to a T fitting 89 to which a horizontally extending pipe 90 is connected. The pipe 90 extends through an opening 91 in the side wall 44 of the housing 21, with a suitable welding or other known sealing means being provided between the pipe 90 and the opening 91. The end 92 of the pipe 90 is turned upwardly and extends through an opening 93 in the lower end of the impeller casing 33. There are multiple outlet orifices 94 at the upper end of the pipe section 92 that direct the liquid horizontally from the pipe 92 across the air gap between the pipe 92 and impeller 33 to the inner wall of the impeller 33. A pressure gauge 95 is also connected to the T fitting 89 to provide an indication of solution pressure flowing through the discharge pipes 87 and 90 and orifices 94.

Still referring to FIGURES 2 and 6, there is a drain pipe 98 connected between the bottom wall 99 of the housing 21 and the upper end of the inlet chamber 70. As FIGURE 2 shows, the bottom wall 99 of the housing 21 is sloped to direct liquid to the drain pipe 98. Also, there is another pipe 100 connected through the side wall 44 of the housing 21 and communicating with the annular trough 56. The pipe 100 leads to a collection tank 101 which has another pipe 102 leading from its lower end to communication with the inlet chamber 70 above the liquid level therein, as shown in FIGURE 6.

There is a conventional heat exchanger 105 mounted to extract or add heat to the liquid within the inlet chamber 70. Also, there are slurry exhaust pipes 106, 107, 108 and 109 connected from the lower ends of the chambers 70, 71, 72 and 73, respectively, for the removal of slurry from the chambers at such intervals as the accumulation of slurry justifies. The pipes 106, 107, 108 and 109 are controlled by suitable valves (not shown). In some cases the slurry may be collected from the pipes 106–109 for reuse or reprocessing.

There is an outlet stack 112 fixed to an opening 113 in the top wall 114 of the housing 21. A series of upwardly inclined oppositely directed baffles 115, 116, 117 and 118 are welded within the outlet stack 112 to provide a tortuous path for the exhaust flow. A stack thermometer 119 is mounted in the side wall of the exhaust stack 112.

A refrigeration coil 120 is mounted with a plurality of fins 121 within the exhaust stack 112 above the baffles 115–118. All of the exhaust stream must pass through the coil. The ends 122 and 123 of the coil 120 extend through sealed openings in the stack wall 112 and are connected in the conventional way to a compressor-condenser 124.

There may be an annular collection trough 125 formed at the bottom of the outlet stack 112 and having its own drain pipe 125' for collecting the condensate. The pipe 125' would extend through the side wall of the housing 21 to a suitable collector (not shown).

A blower 126 is mounted above the exhaust stack 112 with its casing 127 having an inlet opening 128 communicating with the exhaust stack 112. An impeller 129 is rotatably mounted within the casing 127 and is driven by a motor 130. The blower 126 is provided with a cyclone discharge chute 131 as shown in FIGURE 1. In the discharge chute 131, there are exhaust stream control dampers 132 and 133 that can be opened and closed by any suitable means, such as a conventional turnbuckle 134. The dampers 132 and 133 permit regulation of the rate of flow of the exhaust stream through the filtration collector system.

The blower exhaust chute 131 leads to a filter outlet housing 137 having a discharge outlet 138 at its upper end. There is a suitable filter screen 139 mounted within the filter outlet housing 137 below the outlet 138 for filtering any particles still remaining in the air stream. A screw conveyor 140 is mounted at the lower end of the filter outlet housing 137. The conveyor 140 is mounted on a shaft 141 which is rotated by a pulley or gear connection 142 connected to the shaft 143 of a motor 144. The screw conveyor 140 is mounted within a channel 145 that leads to a gravity exhaust 146 for discharging foreign matter into any suitable waste receptacle (not shown). A thermometer 147, a pressure gauge 148, and a velocity gauge 149 are mounted in the filter outlet housing 137 adjacent the outlet 138 thereof.

OPERATION

For the operation of this filtration and collector system, the pump 83, the impeller motor 39, the blower motor 130, and the screw conveyor motor 144 are energized. The afterburner 23 is lit, and the compressor-condenser 124 is started.

Operation of the pump 83 draws liquid solution from the chamber 73 in the liquid compartment 61. This liquid solution is a chemical composition in liquid form which is varied in composition depending upon the composition of foreign particles in the discharge in the stack 22. There is always liquid within the chamber 73 because if liquid is not supplied from succeeding chambers 72, 71, and 70, it is supplied from the reservoir 75 upon opening of the valve 79 as controlled by the float 80.

The pump 83 drives liquid supplied from the chamber 73 through the pipes 87 and 90 to the orifices 94 where the liquid is forced across the air gap between the orifice 94 and the impeller 33. The whirling of the impeller imparts centrifugal forces to the liquid, throwing the liquid outwardly, and the outwardly flaring side wall 34 of the impeller casing 33 causes the liquid to flow upwardly to be discharged laterally outwardly in controlled streams through the holes 35 in the casing 33. These streams are accurately controllable by the speed of rotation of the impeller and by the size and number of holes 35.

The exhaust which flows from the stack 22 is first subjected to the heat of the afterburner 23 which causes more complete combination of particles carried with the exhaust stream. The exhaust stream hits the deflection board 27 and is dispersed outwardly into the housing 21. Since the blower 126 is operating and creating an induced draft below it, the exhaust stream emanating from beneath the deflection board 27 is drawn upwardly.

The exhaust stream next flows into the paths of the liquid streams flowing from the holes 35 of the impeller casing 33. These liquid streams hit the foreign matter carried by the exhaust air and, through a combination of mechanical impact and dissolving, the foreign particles are carried laterally with the solution streams against the deflection board 53. The deflection board 53 deflects the liquid streams and the foreign particles downwardly into the annular trough 56 from which the liquid flows and carries the foreign particles through the pipe 100 to the tank 101 and thence through the pipe 102 to the chamber 70 in the compartment 61.

Since the particles of foreign matter which are wetted or saturated with the liquid have more mass than the pure air in the exhaust stream, it is these foreign particles which are subjected to the impact of the liquid streams, whereas the remaining air in the exhaust can find its way through the liquid streams to flow upwardly as influenced by the operation of the blower 126. As the air flows toward the blower 126, it must flow past the baffles 115, 116, 117, and 118 and pass the refrigeration coil 120. The baffles 115–118 are kept cold by their proximity to the refrigeration coil 120 and hence cause primary condensation of liquid from the exhaust stream. Final condensation occurs at the refrigeration coil 120. This condensation removes the chemical solution which was picked up as the air stream flowed through the liquid streams created by the impeller 32, as well as foreign condensate vapor gases in the exhaust stream. The condensed liquid flows downwardly to the annular trough 125 and to a suitable collector or to the bottom wall 99 of the housing 21, being deflected by the shield 27 against falling into the stack 22, and is discharged through the drain pipe 98 into the chamber 70 of the liquid compartment 61. The condensation of liquid from the air also removes further foreign particles inasmuch as the foreign particles tend to remain with the condensing liquid rather than flow onward with the lighter air stream.

The air flowing from the refrigeration coil 120 is drawn into the blower 126 and is propelled through the discharge chute 131 into the filter outlet housing 137 where further filtering is done by the filter screen 139. The foreign matter collected by the filter 139 falls downwardly and is carried away by the screw conveyor 140. The now purified air flows through the outlet opening 133 to atmosphere.

The liquid which is fed through the pipes 98 and 102 to the chamber 70 is heated or cooled by the heat exchanger 105 to set the liquid at the optimum temperature for ultimate discharge from the impeller 32. This liquid flows serially over the baffle walls 63, 65 and 67 as regulated by the baffle walls 64 and 66 in a known manner, and as the liquid passes through the chambers 70, 71, 72, and 73, the foreign matter entrained in it settles to the bottoms of the compartments for removal through the pipes 106, 107, 108 and 109. Therefore, the liquid is progressively purified in the compartments 70, 71, 72, and 73, and in the compartment 73, is sufficiently purified for recirculation through the impeller 32. At any time the liquid within the chamber 73 needs replenishment as indicated by the position of the float 80, replenishing liquid is supplied from the reservoir 75.

While the drawings illustrate only a single filtration and collector system 20, it should be understood that any number of such systems may be connected together in series with the outlet 138 of one system serving as the inlet stack 22 for another system. It should also be understood that any one of the systems 20 may have more than one impeller assembly 32 arranged in series so that the exhaust stream must pass through a series of screens defined by the liquid streams created by the impellers before reaching the discharge stack 112. These and other variations which are evident from the foregoing description may be made as determined by the kind of exhaust stream that is to be purified and the composition of foreign matter carried by such exhaust stream.

Various changes and modifications may be made within the purview of this invention as will be readily apparent to those skilled in the art.

What is claimed is:

1. An air filtration and collector system comprising a housing having top, bottom and side walls, an inlet adjacent the lower end of the housing for admitting gas carrying foreign particles into the housing, an outlet adjacent the upper end of the housing for discharging gas from the housing, the housing having walls to direct the gas in a path from the inlet to the outlet, a casing rotatably supported within the housing spaced about the inlet and below the outlet, a liquid supply, conduit means to deliver liquid from the liquid supply to the interior of the casing, the casing having side wall means with a plurality of holes through the side wall means, power means to rotate the casing about a substantially vertical axis to sling liquid through the holes and toward and into impact with the side walls of the housing in a plurality of high speed streams in the gas path to thereby remove foreign particles from the gas by bombardment as the gas flows in contact with the liquid streams during flow of the gas from the inlet toward the outlet, trough means supported on the inner side walls of the housing and positioned below the areas of impact of the liquid streams with the housing walls to collect the liquid, conduit means communicating with the trough means and the liquid supply to return the collected liquid to the liquid supply, means in the last-named conduit means to separate foreign particles from the liquid, a condenser coil supported within the housing in the path of flow of the gas between the liquid streams and the outlet to condense liquid from the gas, a compressor-condenser system including the condenser coil for causing the said condensation of liquid from the gas, and means to discharge the condensed liquid from the housing.

2. The system of claim 1 including a plurality of baffle walls adjacent the condenser and in the path of flow of the gas to enhance condensation of liquid from the gas.

3. The system of claim 1 including a pipe extending through the inlet to deliver the gas to the housing, the pipe having an open upper end, and a hood within the housing overlying the upper end of the pipe in spaced relation thereto.

4. The system of claim 1 including fine filter means supported within the housing in the path of flow of the gas between the inlet and outlet, and a screw conveyor supported by the housing below the fine filter means to convey foreign particles from the housing.

References Cited

UNITED STATES PATENTS

| | | | |
|---|---|---|---|
| 719,319 | 1/1903 | Forbes et al. | 55—260 |
| 1,434,301 | 10/1922 | Liljegran | 55—258 |
| 1,673,732 | 6/1928 | Brooks | 55—257 |
| 1,880,017 | 9/1932 | Harmon | 55—260 |
| 1,883,456 | 10/1932 | Ashley | 55—230 |
| 2,105,992 | 1/1938 | Tolman | 261—89 |
| 2,114,780 | 4/1938 | Juelson | 55—258 |
| 2,157,416 | 5/1939 | Kjos | 55—258 |
| 2,282,622 | 5/1942 | Torrence | 261—88 |
| 2,529,045 | 11/1950 | Ortgies. | |
| 2,583,252 | 1/1952 | Carraway | 55—259 |
| 2,646,263 | 7/1953 | Goldberg | 55—259 |
| 2,805,844 | 9/1957 | McMaster | 261—88 |
| 3,140,163 | 7/1964 | Hausberg | 55—257 |
| 3,194,544 | 7/1965 | Jamison et al. | 55—230 |
| 3,239,999 | 3/1966 | Price | 261—17 |
| 3,336,733 | 8/1967 | Wisting. | |
| 2,143,628 | 1/1939 | Lea | 55—230 |
| 2,181,801 | 11/1939 | Davison et al. | 55—230 |
| 2,721,623 | 10/1955 | Fletcher et al. | 261—88 |
| 3,353,337 | 11/1967 | Gale | 55—232 |
| 3,406,498 | 10/1968 | Wisting | 261—89 |

FOREIGN PATENTS

| | | |
|---|---|---|
| 19,836 | 1912 | Great Britain. |
| 77,930 | 11/1918 | Switzerland. |

HARRY B. THORNTON, Primary Examiner

B. NOZICK, Assistant Examiner

U.S. Cl. X.R.

55—228, 230, 259, 260, 269, 439, 446; 261—17, 118, 84